(12) United States Patent
Sevindik et al.

(10) Patent No.: US 11,627,533 B2
(45) Date of Patent: *Apr. 11, 2023

(54) DYNAMIC DATA RATE SELECTION

(71) Applicant: Charter Communications Operating, LLC, St. Louis, MO (US)

(72) Inventors: Volkan Sevindik, Parker, CO (US); Muhib T. Oduwaiye, Aurora, CO (US); Haider Syed, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/835,455

(22) Filed: Jun. 8, 2022

(65) Prior Publication Data
US 2022/0303913 A1 Sep. 22, 2022

Related U.S. Application Data

(63) Continuation of application No. 17/113,172, filed on Dec. 7, 2020, now Pat. No. 11,388,675.

(51) Int. Cl.
| | |
|---|---|
| H04W 52/14 | (2009.01) |
| H04W 52/24 | (2009.01) |
| H04W 16/14 | (2009.01) |
| H04W 52/34 | (2009.01) |
| H04W 52/36 | (2009.01) |
| H04W 52/28 | (2009.01) |

(52) U.S. Cl.
CPC ......... *H04W 52/146* (2013.01); *H04W 16/14* (2013.01); *H04W 52/245* (2013.01); *H04W 52/285* (2013.01); *H04W 52/343* (2013.01); *H04W 52/367* (2013.01)

(58) Field of Classification Search
CPC . H04W 52/146; H04W 52/245; H04W 16/14; H04W 52/343; H04W 52/367; H04W 52/385
See application file for complete search history.

(56) References Cited

U.S. PATENT DOCUMENTS

| | | | |
|---|---|---|---|
| 11,388,675 B2 * | 7/2022 | Sevindik | H04W 52/343 |
| 2018/0014311 A1 | 1/2018 | Bhargava et al. | |
| 2020/0336932 A1 * | 10/2020 | Jiang | H04L 43/0823 |

\* cited by examiner

*Primary Examiner* — Brenda H Pham
(74) *Attorney, Agent, or Firm* — Young Basile Hanlon & MacFarlane, P.C.

(57) ABSTRACT

Dynamic data rate selection in wireless networks is described. The includes sending, by a wireless controller to a base station, an access point power-data rate table. The base station updates a base station power-data rate table with the access point power-data rate table based on checking defined thresholds, confirms the validity of the updated base station power-data rate table by receiving measurements from a user device responsive to communications using the updated base station power-data rate table, reverts to a previous base station power-data rate table if the measurements indicate that the updated base station power-data rate table is not correct, and sends to the wireless controller one of the updated base station power-data rate table or the previous base station power-data rate table. The wireless controller updates the access point power-data rate table and sends the updated access point power-data rate table to an access point.

20 Claims, 5 Drawing Sheets

DYNAMIC DATA RATE SELECTION

CROSS REFERENCE TO RELATED APPLICATION

This application is a continuation of U.S. patent application Ser. No. 17/113,172, filed on Dec. 7, 2020, of which is incorporated herein by reference.

TECHNICAL FIELD

This disclosure relates to wireless communications. More specifically, this disclosure relates to dynamic data rate selection in wireless networks.

BACKGROUND

Wireless communication networks include multiple types of wireless communication systems including 4G, 5G, Wifi®, satellite, and the like to communicate or transfer data between two devices using base stations, access points, and the like. The wireless communication systems use uplink and downlink communication channels or links to communicate data between the two devices. The uplink communication channel generally refers to communications from a user device toward a base station. The downlink communication channel generally refers to communications from the base station towards the user device. The uplink communication channel and the downlink communication channel each have data rates which are dynamically configurable. In the downlink communication channel, the data rate is based on a configured power level.

Dynamic rate selection techniques are used to dynamically change a downlink data rate in the wireless communication systems. These dynamic rate selection techniques are needed, for example, to account for channel quality and other service level characteristics. For example, in Wifi®, an access point's transmission power reduces with increasing distance and consequently, a measured received power level at a Wifi® user device decreases with increasing distance from the access point. The Wifi® user device reports the measured received power level and channel quality to the access point. The access point sets the downlink data rate based on the measured received power level. The amount of transmitted throughput in the downlink per received power level is fixed. That is, each power level has a set or supported data rate in the downlink. However, each of the wireless communication systems uses a different received power level to data rate classification or arrangement. Consequently, the quality of service for a user device can be impacted when accessing or using different wireless communication systems during a wireless communications session.

SUMMARY

Disclosed herein are methods and systems for dynamic data rate selection in wireless networks. In implementations, a method for dynamic data rate update includes sending, by a wireless controller to a base station, an access point power-data rate table, updating, by the base station, a base station power-data rate table with the access point power-data rate table based on checking defined thresholds, confirming, by the base station, the validity of the updated base station power-data rate table by receiving measurements from a user device responsive to communications using the updated base station power-data rate table, reverting, by the base station, to a previous base station power-data rate table if the measurements indicate that the updated base station power-data rate table is not correct, sending, by the base station to the wireless controller, one of the updated base station power-data rate table or the previous base station power-data rate table, updating, by the wireless controller, the access point power-data rate table with a received base station power-data rate table and sending, by the wireless controller, updated access point power-data rate table to an access point.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
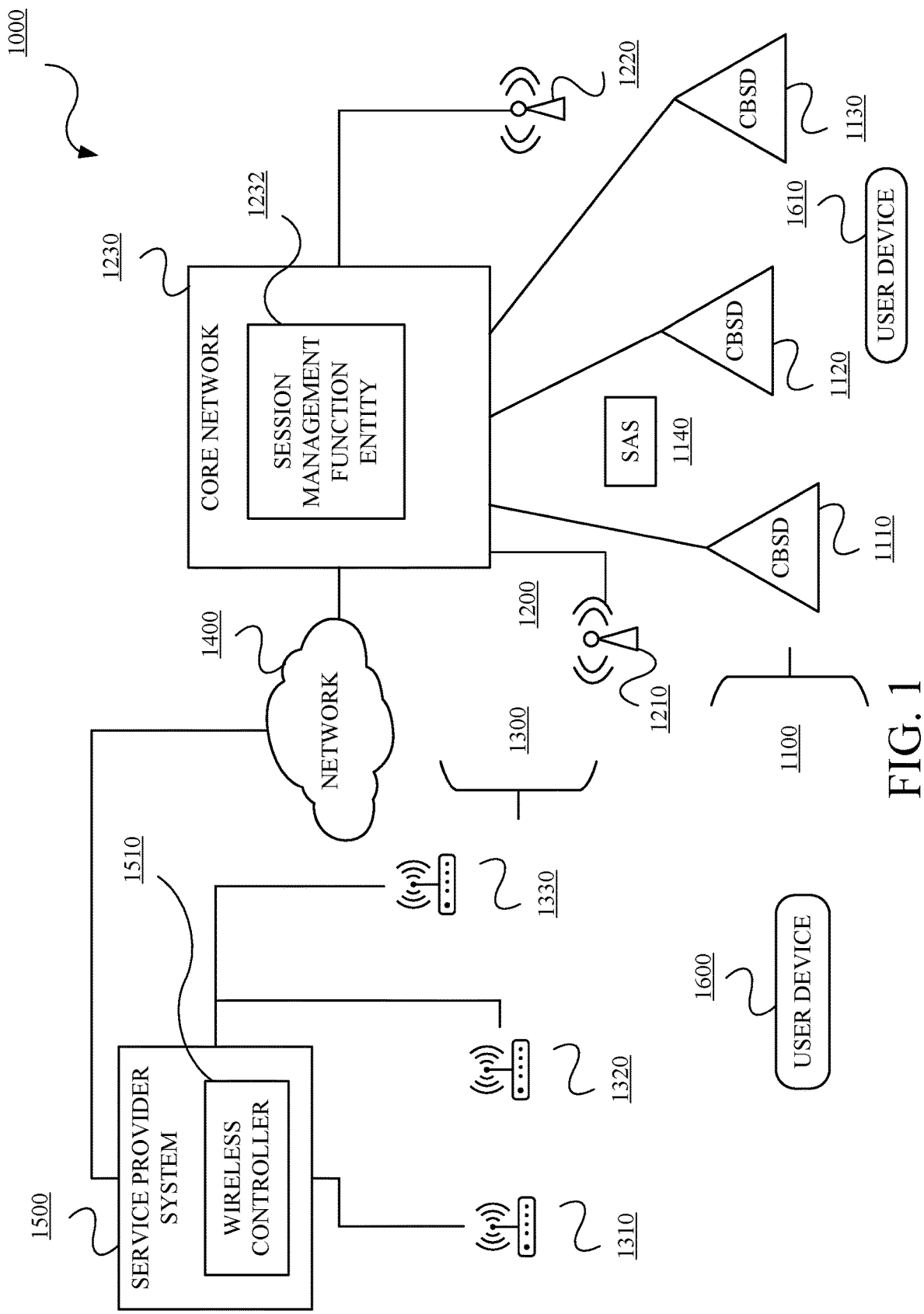
FIG. 1 is a diagram of an example of a telecommunications network in accordance with embodiments of this disclosure.

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "computer" or "computing device" includes any unit, or combination of units, capable of performing any method, or any portion or portions thereof, disclosed herein. For example, the "computer" or "computing device" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks or activities. For example, applications may perform one or more functions including, but not limited to, telephony, web browsers, e-commerce transactions, media players, travel scheduling and management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, compositions and methods. Those of ordinary skill may thus recognize that other elements and/or steps may be desirable or necessary to implement the devices, systems, compositions and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Disclosed herein are methods and systems for dynamic data rate selection amongst different wireless communications system in a telecommunications network. In implementations, an access point (AP) associated with a local wireless or WiFi® network maintains a power or signal and data rate table (AP table) based on user device or terminal measurements. A base station (BS) associated with a cellular network maintains a power or signal, modulation and coding scheme (MCS), and a channel quality indicator (CQI) table (BS table) based on user device or terminal measurements. The AP table is shared with the BS. The BS updates the BS table based on the AP table as appropriate. The BS verifies the updated BS table with user device measurements and revises the BS table as appropriate. The BS table is shared with the AP, which in turn uses the shared BS table to dynamically set downlink data rates. Consequently, users of the user devices will see similar or same service levels irrespective of the wireless communications system used during a wireless communication session.

In implementations, sets of APs and BSs can be formed into multiple clusters. Each of the APs and BSs in a cluster share a data rate table. That is, different clusters can have different data rate tables. Clusters can be formed based on geographic location, AP density, BS density, AP and BS density, traffic levels, and the like and combinations thereof.

In implementations, the BS evaluates the updated BS table for accuracy by checking data retransmission rates, bit error rates, and the like. The BSs can update and maintain the BS table based on the evaluation. In implementations, the BS can check reported feedback from user devices for each updated data rate. Each user device connected to the BS can provide its feedback in the uplink. Based on all the collected feedback from user devices, the BS can verify if the modified data rates are optimum. That is, the data sent by this data rate is decodable by the user devices.

In implementations, a WiFi controller can aggregate AP tables from controlled APs. In implementations, the AP tables can be averaged to send one AP table to the BS. In implementations, other statistical techniques can be applied to the multiple AP tables.

In implementations, dynamic data rate selection using the shared BS table can be based on number of wireless access points, user density, geography, event based, combinations thereof, and the like. For example, event based can include users entering or leaving an event and transitioning from cellular access to WiFi based access or from WiFi based access to cellular access, respectively.

FIG. 1 is a diagram of an example of a telecommunications network 1000 in accordance with embodiments of this disclosure. In an implementation, the architecture 1000 may include a Citizens Broadband Radio Service (CBRS) or shared spectrum network 1100 (collectively "shared spectrum network"), a 4G licensed spectrum network, a 5G licensed spectrum network, or other licensed spectrum network 1200 (collectively "licensed spectrum network"), and a local wireless or WiFi® network 1300 (collectively "local wireless network"). The wireless communication systems are examples and other wireless communication systems can be used without departing from the scope of the specifications or claims. User devices or terminals 1600 and 1610 can be connected to or in communication with (collectively "in communication with") one or more of the local wireless network 1300, the shared spectrum network 1100, and/or the licensed spectrum network 1200. The number of user devices or terminals is illustrative and the architecture 1000 may include more or less base stations. The architecture 1000 is illustrative and may include additional, fewer or different devices, entities and the like which may be similarly or differently architected without departing from the scope of the specification and claims herein. Moreover, the illustrated devices may perform other functions without departing from the scope of the specification and claims herein.

In implementations, the licensed spectrum network 1200 can include base stations 1210 and 1220. The number of base stations is illustrative and the architecture 1000 may include more or less base stations. The base stations 1210 and 1220 can connect to a core network 1230, which may include a session management function (SMF) entity 1232. The SMF entity 1232 manages configuration parameters for defining traffic steering parameters, ensures routing of packets, guarantees delivery of incoming packets (i.e., data and control information), and the like by sending and receiving control messages to and from other entities in the core network 1230 and external entities. The core network 1230 can be in communication with a network 1400, which may include at least the Internet and other infrastructure networks.

In implementations, the CBRS network 1100 can include CBRS devices (CBSDs) 1110, 1120, and 1130. In implementations, the number of CBSDs is illustrative and the architecture 1000 can include more or less CBSDs. The architecture 1000 can include a SAS 1140 which is in communication with each of the CBSDs 1110, 1120, and 1130 as described herein. The CBRS spectrum is a type of shared spectrum, license-by-rule spectrum, or lightly licensed spectrum which is shared between multiple entities including government users (such as the military), licensed users, and non-licensed users. For example, shared spectrum may be used for fixed wireless access networks. CBRS is a multi-tiered wireless band between 3.550 MHz and 3.700 MHz. In particular, CBRS is a three-tiered access framework including incumbent users (i.e., federal, military, and the like), priority access license (PAL) users (winning auction bidders), and general authorized access (GAA) users, where the GAA users are permitted to use any portion of the CBRS spectrum not assigned to a higher tier user and may also operate opportunistically on unused priority access spectrum. Availability of CBRS spectrum dynamically changes depending on use by higher priority entities. Higher tier users are protected from lower tier users using the centralized SAS 1140, which may be a federal or commercial entity. The SAS 1140 authorizes or grants spectrum to CBSDs and performs interference management to protect higher tier users. This protection may include, for example, dropping CBSDs which are GAA users. In summary, CBRS is an interference limited network which means that the performance of the network and the data sent to CBRS subscribers is limited by the amount of interference the CBRS users or subscribers experience in the frequency band of operation.

In implementations, the local wireless network 1300 can include access points 1310, 1320, and 1330. The number of access points is illustrative and the architecture 1000 may include more or less access points. The access points 1310, 1320, and 1330 can be connected to a wireless controller 1510 provisioned in a service provider system 1500. The wireless controller 1510 can manage, configure, and control the access points 1310, 1320, and 1330 to provide access to the network 1400, for example.

The communications between the user devices 1600 and 1610, particular CBSDs 1110, 1120, and 1130, particular base stations 1210 and 1320, the core network 1230, the SMF entity 1232, the network 1400, particular access points 1310, 1320, and 1330, the service provider system 1500, the wireless controller 1510, as appropriate and applicable, may include wired communications, wireless communications, or a combination thereof. In an implementation, the architecture 1000 may execute the techniques described in FIGS. 3 and 4.

The user devices 1600 and 1610 can be, but is not limited to, a dual SIM device, end user devices, cellular telephones, Internet Protocol (IP) devices, mobile computers, laptops, handheld computers, personal media devices, smartphones, notebooks, notepads, and the like which can access and operate with at least one of the shared spectrum network 1100, the licensed spectrum network 1200, the local wireless 1300, and the like.

The CBSDs 1110, 1120, and 1130 can be a base station, an access point, an access node, or like device which enables radio communications access between, for example, the user device 1610 to other devices using the shared spectrum network 1100. The CBSDs 1110, 1120, and 1130 can connect to the core network 1230 and the SMF entity 1232. Each CBSD 1110, 1120, and 1130 can be authorized and granted spectrum allocation by the SAS. Each CBSD 1110, 1120, and 1130 can have one or more sectors which provide wireless communications coverage. A CBSD maintains a power or signal, Modulation and Coding Scheme (MCS) and Channel Quality Indicator (CQI) table to set a downlink data rate. In implementations, the power level is indicated by a received signal strength indicator (RSSI). The RSSI is an indication of the power level being received by a receiving radio, e.g., the user device. The RSSI is an example indicator and other measures can be used without departing from the scope of the specification and claims. The RSSI is a wideband power measurement, and shows the total amount of power in the bandwidth used. Reference Signal Received Power (RSRP) is the signal power of the OFDM symbol sent from the CBSD to the user device. In implementations, the table is a RSSI-RSRP-CQI-MCS table.

The base stations 1210 and 1220 can be a node-B, an evolved node-B, an access point, an access node or like device which enables radio communications access between, for example, a user device to other devices using the licensed spectrum network 1200. Each base station 1210 and 1220 can have one or more sectors which provide wireless communications coverage. A base station maintains a power or signal, Modulation and Coding Scheme (MCS)

and Channel Quality Indicator (CQI) table to set a downlink data rate. In implementations, the power level is indicated by a received signal strength indicator (RSSI). The RSSI is an indication of the power level being received by a receiving radio, e.g., the user device. The RSSI is an example indicator and other measures can be used without departing from the scope of the specification and claims. In implementations, the table is a RSSI-RSRP-CQI-MCS table. In implementations, the RSSI-RSRP-CQI-MCS table can be referred to as the CBSD table, 5G CBSD table, base station table, and BS table.

The access points 1310, 1320, and 1330 can be a wireless access point, an access node, or like device which enables radio communications access between, for example, the user device 1600 to other devices using the local wireless network 1300. Each of the access points 1310, 1320, and 1330 provide wireless communications coverage. An access point can be initially provisioned with a power level versus data rate table to set a downlink data rate. The access point can update the power level versus data rate table based on power measurement information received from user devices. In implementations, the power level is indicated by a received signal strength indicator (RSSI). The RSSI is an indication of the power level being received by a receiving radio, e.g., the user device. The RSSI is an example indicator and other measures can be used without departing from the scope of the specification and claims. In implementations, the table is a RSSI-data rate table. In implementations, the RSSI-data rate table can be referred to as the wireless access point table, access point table, and AP table.

Operationally, the CBSDs 1110, 1120, and 1130 can be granted spectrum by the SAS 1140. The CBSDs 1110, 1120, and 1130 are further provisioned with RSSI-RSRP-CQI-MCS tables. The access points 1310, 1320, and 1330 are provisioned with RSSI-data rate tables. The access points 1310, 1320, and 1330 receive measurements from a user device 1600, for example, and updates the RSSI-data rate table accordingly. The wireless controller 1510 receives the RSSI-data rate tables from the access points 1310, 1320, and 1330. The wireless controller 1510 statistically determines one RSSI-data rate table based on the received RSSI-data rate tables. The wireless controller 1510 sends the one RSSI-data rate table to appropriate ones of the CBSDs 1110, 1120, and 1130 via the SMF entity 1232 in the core network 1230. The appropriate CBSDs 1110, 1120, and 1130 update the RSSI-RSRP-CQI-MCS table based on the RSSI-data rate table based on two factors. The appropriate CBSDs 1110, 1120, and 1130 check, for each row, if the RSSI values in the RSSI-data rate table and RSSI-RSRP-CQI-MCS table are within a defined range. For example, the defined range is 1 dB. If for a particular row, the RSSI values are within the defined range, no updates will be made to that row in the RSSI-RSRP-CQI-MCS table. If for a particular row, the RSSI values are outside the defined range, then the appropriate CBSDs 1110, 1120, and 1130 check, for each row, whether the difference between the RSSI value in the in the RSSI-data rate table and the RSSI value in the RSSI-RSRP-CQI-MCS table is less than a Reference Signal Received Power (RSRP) value in the RSSI-RSRP-CQI-MCS table. If the difference is less than the RSRP value, then a MCS value in the RSSI-RSRP-CQI-MCS table is updated. The MCS value in the RSSI-RSRP-CQI-MCS table is increased if the data rate in the RSSI-data rate table is greater than the data rate, e.g., the MCS value, in the RSSI-RSRP-CQI-MCS table. The MCS value in the RSSI-RSRP-CQI-MCS table is maintained if the data rate in the RSSI-data rate table is less than the data rate in the RSSI-RSRP-CQI-MCS table. If the difference is equal to or greater than the RSRP value, then the values in the RSSI-RSRP-CQI-MCS table are maintained. The values in the updated RSSI-RSRP-CQI-MCS table, if appropriate, are confirmed by testing transmissions with a user device, for example, user device 1600. If the values in the updated RSSI-RSRP-CQI-MCS table are confirmed, the updated RSSI-RSRP-CQI-MCS table is sent back to the wireless controller 1510 via the SMF entity 1232. If the values in the updated RSSI-RSRP-CQI-MCS table are problematic, the appropriate CBSDs 1110, 1120, and 1130 revert to the values in the previous RSSI-RSRP-CQI-MCS table, and that table is sent back to the wireless controller 1510 via the SMF entity 1232. The wireless controller 1510 applies the received RSSI-RSRP-CQI-MCS table to update the individual AP tables, as appropriate, and then sends the updated AP tables to the access points 1310, 1320, and 1330.

Figure 2:
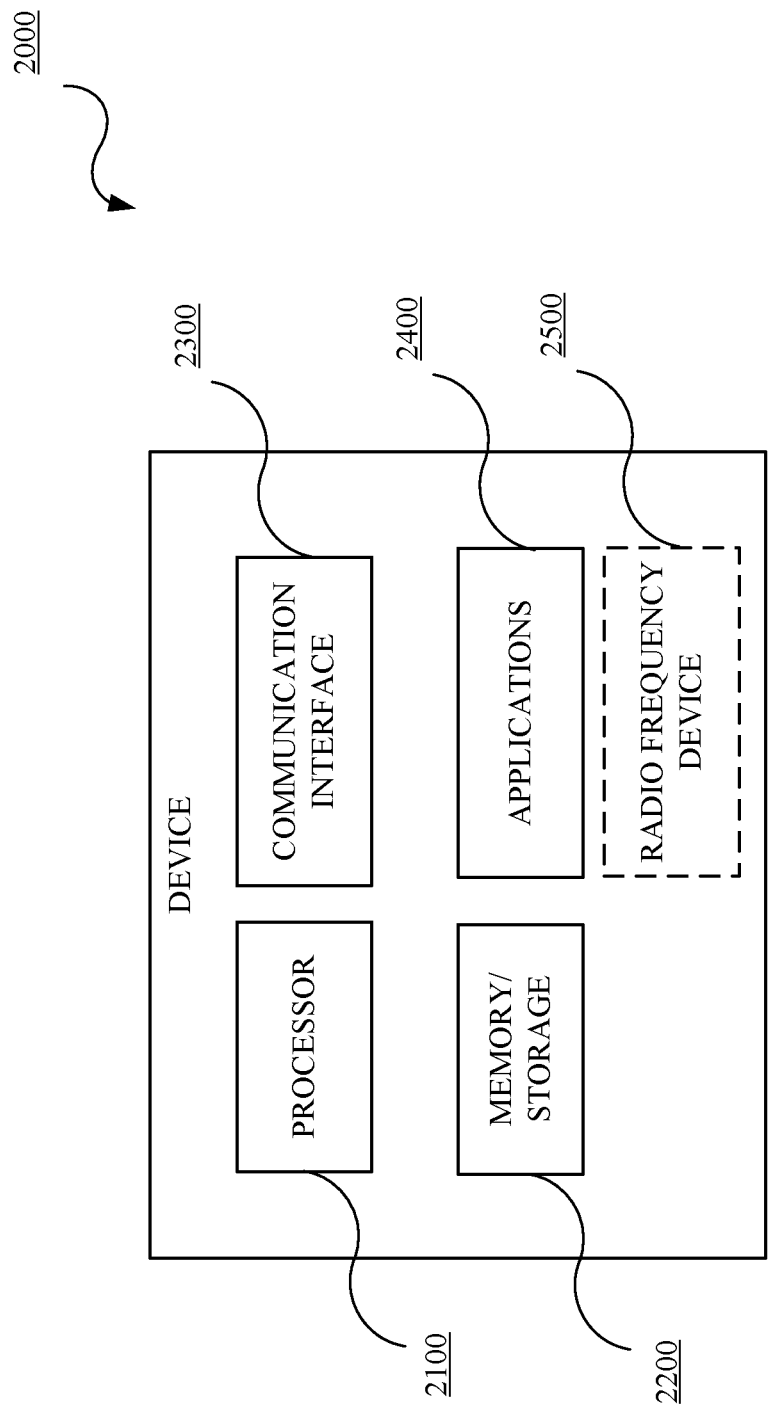
FIG. 2 is a block diagram of an example of a device in accordance with embodiments of this disclosure.

FIG. 2 is a block diagram of an example of a device 2000 in accordance with embodiments of this disclosure. The device 2000 may include, but is not limited to, a processor 2100, a memory/storage 2200, a communication interface 2300, and applications 2400. In an implementation, the device 2000 can include a radio frequency device 2500. The device 2000 can include or implement, for example, the user devices or terminals 1600 and 1610, the base stations 1210 and 1220, the core network 1230, the SMF entity 1232, the CBSDs 1110, 1120, and 1130, the access points 1310, 1320, and 1330, the wireless controller 1510, and the service provider system 1500. In an implementation, the memory/storage 2200 may store the power measurements, the AP table, the BS table, a RSSI-RSRP-MCS-CQI table, RSSI-data rate table, and the like and other information. The applicable or appropriate techniques or methods as described herein may be stored in the memory/storage 2200 and executed by the processor 2100 in cooperation with the memory/storage 2200, the communications interface 2300, the applications 2400, and the radio frequency device 2500 (when applicable) as appropriate. The device 2000 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

Figure 3:
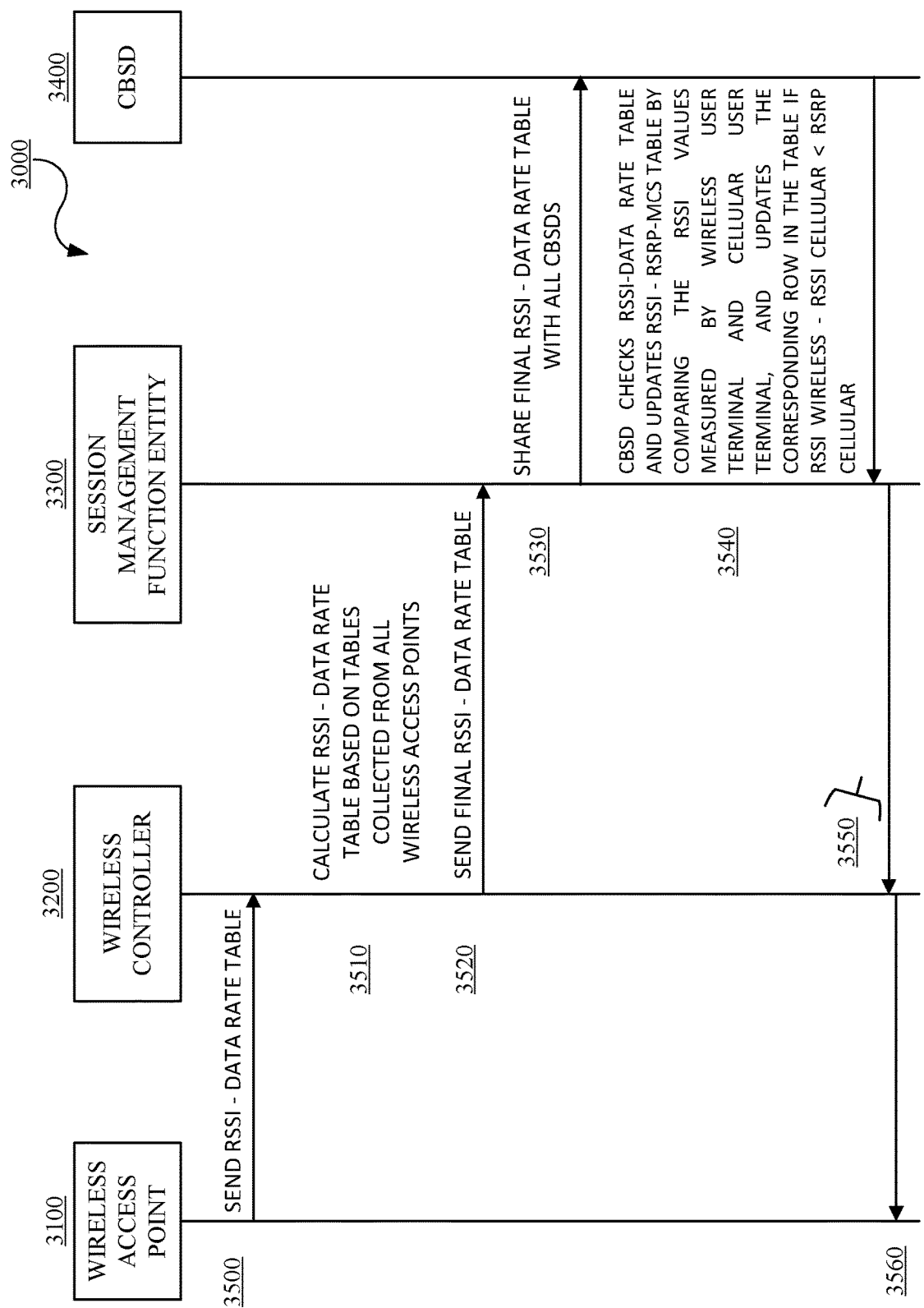
FIG. 3 is a flow diagram of an example of dynamic rate selection in accordance with embodiments of this disclosure.

FIG. 3 is a flow diagram 3000 of an example of dynamic data rate selection in accordance with embodiments of this disclosure. The flow diagram 3000 describes communications and events with respect to a wireless access point 3100, a wireless controller 3200, a SME entity 3300, and a CBSD 3400. Initially, the wireless access point 3100 sends an AP table to the wireless controller 3200 (3500). In implementations, the wireless access point 3100 is provisioned with an AP table with a defined or preset power or signal level (e.g., RSSI) and supported data rate for each signal level. The wireless access point 3100 can modify the AP table based on channel conditions or quality measurements received from a user device or terminal. The wireless access point 3100 changes the data rate level for a signal level. In implementations, the wireless controller 3200 can collect or receive AP tables from all controlled wireless access points and apply a statistical method to the collected AP tables to generate a single AP table (3510). In implementations, the statistical method can include, but is not limited to, determining an average, a standard deviation, mean, and the like.

The wireless controller 3200 can send the AP table to a session management function (SMF) entity 3300 in a core network (3520). The session management function (SMF) entity 3300 shares the AP table with appropriate CBSDs or base stations 3400 (3530). In implementations, the appropriate CBSDs or base stations can be based on geographic location, AP density, BS density, AP and BS density, traffic levels, and the like and combinations thereof. Each CBSD 3400 has a 5G CBSD table, which is initially provisioned and updated due to user device channel quality measurements. Each CBSD 3400 can review the AP table and modify the 5G CBSD table based on a two stage test (3540). In a first stage, the CBSD 3400 compares, for each row in the tables, a RSSI value in the AP table versus a RSSI value in the 5G CBSD table. If the RSSI value in the AP table and the RSSI value in the 5G CBSD table are within a defined value, then the data rate value (e.g., MCS value) will not be updated in that 5G CBSD table for that row. In implementations, the defined value is +/−1 dB. In the event that the RSSI value in the AP table and the RSSI value in the 5G CBSD table is greater than or outside the defined value, then the CBSD 3400 determines if a difference between the RSSI value in the in the AP table and the RSSI value in the 5G CBSD table is less than a Reference Signal Received Power (RSRP) value in the 5G CBSD table (see Equation 1). If the difference between the RSSIs is less than the RSRP value then the MCS value in the 5G CBSD table can be updated. The MCS value in the 5G CBSD table is increased if the AP data rate is greater than the 5G CBSD data rate, e.g., the MCS value. The MCS value in the 5G CBSD table is maintained if the AP data rate is less than the 5G CBSD data rate. If the difference between the RSSIs is equal to or greater than the RSRP, then the MCS value in the 5G table is not updated.

$$\text{RSSI AP} - \text{RSSI 5G CBSD} < \text{RSRP 5G CBSD} \qquad \text{Equation 1}$$

The CBSD 3400 then verifies or confirms that the updated 5G CBSD table works based on channel quality measurements received from a user device. The CBSD 3400 maintains the MCS values if feedback from the user device confirms correctness of the updated 5G CBSD table. The CBSD 3400 modifies the MCS values in the updated 5G CBSD table if the MCS values are over-dimensioned or under-dimensioned. That is, whether the MCS values are too fast, signal level is too low, and the like with respect to the user devices. Once confirmed and modified, as appropriate, the CBSD 3400 will share the confirmed 5G CBSD table with the wireless controller 3200 via the and the SMF entity 3300 (3550). The wireless controller 3200 will update the AP table based on the confirmed 5G CBSD table. The wireless controller 3200 will update the AP data rates in the AP table with the data rates in the received confirmed 5G CBSD table. The wireless controller 3200 will send the updated AP table to the wireless access point 3100 (3560). In implementations, where the originally sent AP table was a statistically determined AP table, the wireless controller 3200 will update each of the AP tables based on the received confirmed 5G CBSD table.

Figure 4:
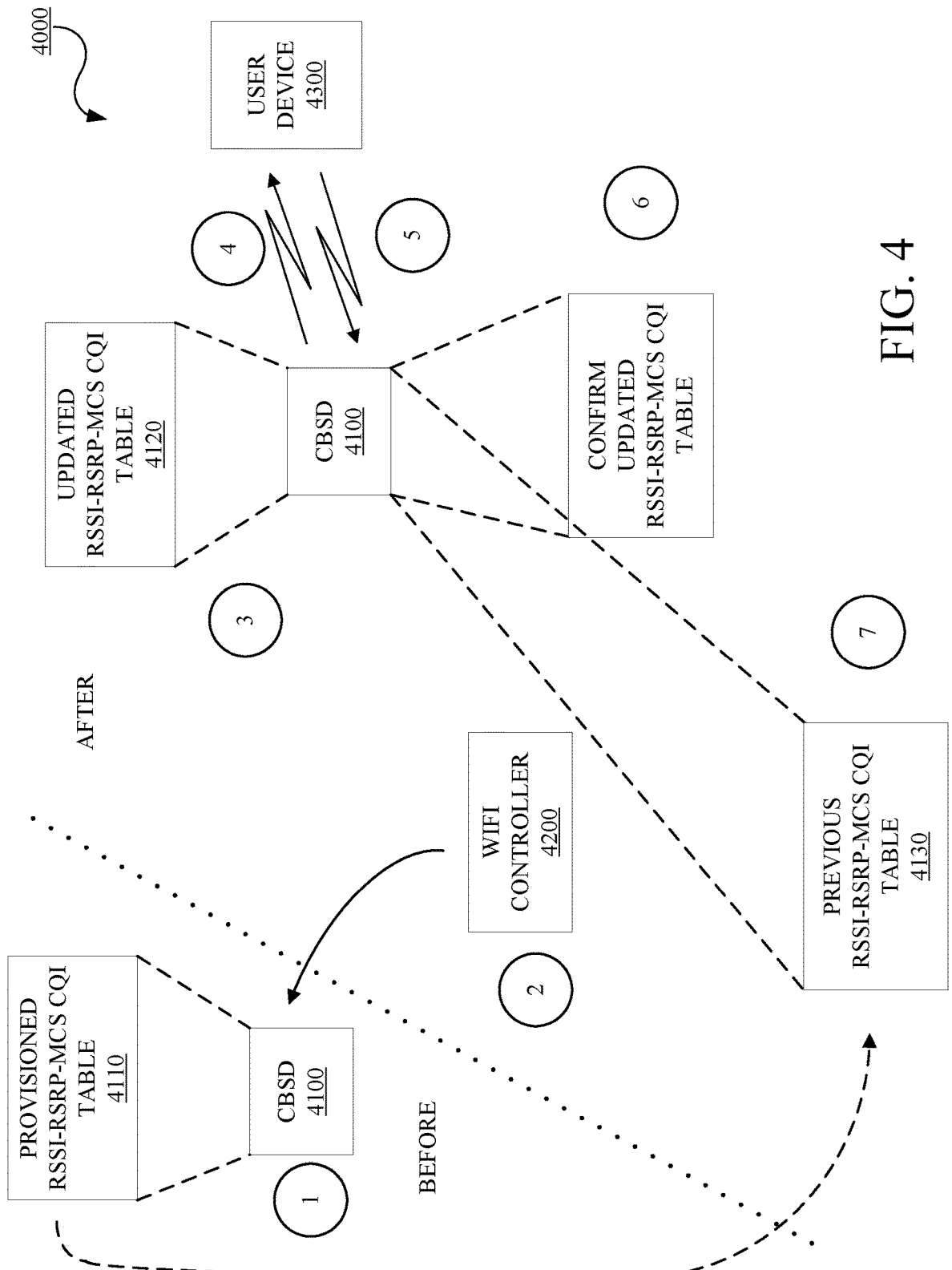
FIG. 4 is a flow diagram of an example of dynamic rate selection in accordance with embodiments of this disclosure.

FIG. 4 is a flow diagram of an example of dynamic rate selection in accordance with embodiments of this disclosure. The flow diagram 4000 describes before and after communications and events with respect to a CBSD 4100, a wireless controller 4200, and a user device 4300. Initially, the CBSD 4100 is provisioned with a CBSD power-data rate table such as a RSSI-RSRP-MCS-CQI table 4110 (1). The CBSD 4100 receives an AP power-data rate table from the wireless controller 4200 (2). The AP power-data rate table can be, for example, a RSSI-data rate table. The CBSD 4100 updates the provisioned RSSI-RSRP-MCS-CQI table 4110 with an updated RSSI-RSRP-MCS-CQI table 4120 as described herein (3). The CBSD 4100 tests the updated RSSI-RSRP-MCS-CQI table 4120 using transmissions (4) with and measurements from the user device 4300 (5). The CBSD 4100 confirms via the measurements whether the RSSI-RSRP-MCS-CQI table 4120 is valid (6). If the updated RSSI-RSRP-MCS-CQI table 4120 is not valid, the CBSD 4100 rejects the updates and reverts to a previous RSSI-RSRP-MCS-CQI table 4130 (7), such as for example, the provisioned RSSI-RSRP-MCS-CQI table 4110.

Figure 5:
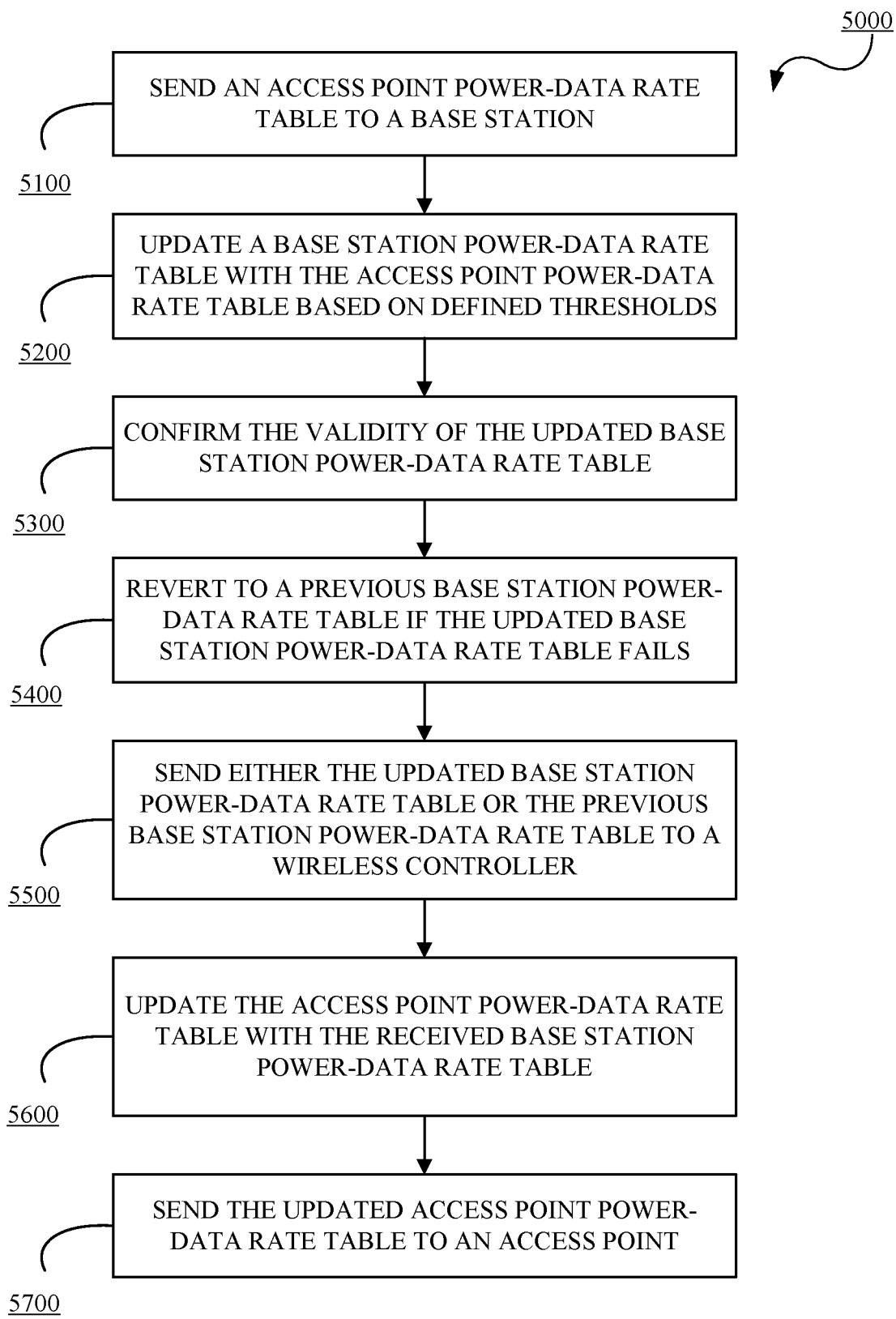
FIG. 5 is a flowchart of an example method for dynamic rate selection in accordance with embodiments of this disclosure.

FIG. 5 is a flowchart of an example method 5000 for dynamic rate selection in accordance with embodiments of this disclosure. The method 5000 includes: sending 5100 an access point power-data rate table to a base station; updating 5200 a base station power-data rate table with the access point power-data rate table based on defined thresholds; confirming 5300 the validity of the updated base station power-data rate table; reverting 5400 to a previous base station power-data rate table if the updated base station power-data rate table fails; sending 5500 either the updated base station power-data rate table or the previous base station power-data rate table to a wireless controller; updating 5600 the access point power-data rate table with the received base station power-data rate table; and sending 5700 the updated access point power-data rate table to an access point. For example, the method 5000 may be implemented, as applicable and appropriate, by the base stations 1210 and 1220, the core network 1230, the SMF entity 1232, the CBSDs 1110, 1120, and 1130, the SAS 1140, the access points 1310, 1320, and 1330, the service provider system 1500, the wireless controller 1510, the user devices 1600 and 1610, the device 2000, the processor 2100, the memory/storage 2200, the communication interface 2300, the applications 2400, the wireless access point 3100, the wireless controller 3200, the SME entity 3300, the CBSD 3400, the CBSD 4100, the wireless controller 4200, and the user device 4300.

The method 5000 includes sending 5100 an access point power-data rate table to a base station. Access points are provisioned with power-data rate tables. These power-data rate tables are updated based on user device measurements. The access points send or a wireless controller obtains from controlled access points, the access point tables. In implementations, the wireless controller generates one access point table from the collected power-data rate tables. This access point table is sent to an associated base station based on a defined event. For example, the access point and base station can be associated based on geography, cluster-based, location, access point-base station density, and the like. The defined event can be user device density, starting of an event such as a game, concert, and like, ending of the event, and the like.

The method 5000 includes updating 5200 a base station power-data rate table with the access point power-data rate table based on defined thresholds. The base station updates the base station power-data rate table based on defined criteria as described herein.

The method 5000 includes confirming 5300 the validity of the updated base station power-data rate table. The base station transmits with a user device and receives measurements reflective of the updated base station power-data rate table. The measurements are indicative of whether the user device can operate with the updated base station power-data rate table.

The method 5000 includes reverting 5400 to a previous base station power-data rate table if the updated base station power-data rate table fails. If the user device can't operate with the updated base station power-data rate table, then the base station reverts to the previous base station power-data rate table.

The method 5000 includes sending 5500 either the updated base station power-data rate table or the previous base station power-data rate table to a wireless controller. The base station sends a base station power-data rate table, either the updated base station power-data rate table or the previous base station power-data rate table to the wireless controller.

The method 5000 includes updating 5600 the access point power-data rate table with the received base station power-data rate table. The wireless controller updates the access point power-data rate table(s) as appropriate.

The method 5000 includes sending 5700 the updated access point power-data rate table to an access point. The wireless controller sends the updated access point power-data rate table(s) to the access points.

In general, a method for dynamic data rate update includes sending, by a wireless controller to a base station, an access point power-data rate table, updating, by the base station, a base station power-data rate table with the access point power-data rate table based on checking defined thresholds, confirming, by the base station, the validity of the updated base station power-data rate table by receiving measurements from a user device responsive to communications using the updated base station power-data rate table, reverting, by the base station, to a previous base station power-data rate table if the measurements indicate that the updated base station power-data rate table is not correct, sending, by the base station to the wireless controller, one of the updated base station power-data rate table or the previous base station power-data rate table, updating, by the wireless controller, the access point power-data rate table with a received base station power-data rate table, and sending, by the wireless controller, updated access point power-data rate table to an access point.

In implementations, the checking defined threshold includes determining, for each row, whether a received signal strength indicator from the access point power-data rate table and a received signal strength indicator from the base station power-data rate table are within a defined range, and foregoing an update, for each row, when the received signal strength indicator from the access point power-data rate table and a received signal strength indicator from the base station power-data rate table are within the defined range. In implementations, the defined range is 1 dB. In implementations, the checking defined threshold includes determining, for each row, whether a difference between the received signal strength indicator from the access point power-data rate table and the received signal strength indicator from the base station power-data rate table is less than a reference signal received power from the base station power-data rate table when the received signal strength indicator from the access point power-data rate table and a received signal strength indicator from the base station power-data rate table fall outside the defined range, and foregoing an update, for each row, when the difference is equal to or greater than the reference signal received power. In implementations, the checking defined threshold includes determining, for each row, whether a data rate from the access station power-data rate table is greater than the data rate in the base station power-data rate table when the difference is less than the reference signal received power, and foregoing an update, for each row, when the data rate in the base station power-data rate table is equal to or greater than the data rate from the access station power-data rate table. In implementations, the checking defined threshold includes increasing, for each row, the data rate in the base station power-data rate table when the data rate in the base station power-data rate table is less than the data rate in the access station power-data rate table. In implementations, the sending, by a wireless controller to a base station includes receiving, by the wireless controller, multiple access station power-data rate tables from multiple access points, and statistically combining, by the wireless controller, the multiple access station power-data rate tables to generate the access point power-data rate table. In implementations, the updating, by the wireless controller includes updating, by the wireless controller, each of the multiple access station power-data rate tables using the received base station power-data rate table. In implementations, the sending, by a wireless controller to a base station includes performing, by the wireless controller, dynamic data rate update based on a defined event. In implementations, the defined event is at least one of ending of an event, starting of an event, user device density, data traffic, geographic location, and base station and access point density.

In implementations, a system includes a plurality of wireless access points, each wireless access point having a signal power and data rate table, at least one Citizens Broadband Radio Service (CBRS) device (CBSD) having a signal power and code rate table, and a wireless controller configured to send a signal power and data rate table to the at least one CBSD based on a defined event. The at least one CBSD is configured to determine whether updating thresholds are met by comparing aspects of the signal power and data rate table with the signal power and data rate table, and confirm viability of updated signal power and code rate table when updating thresholds are met, and send the updated signal power and code rate table when confirmed. The wireless controller is configured to update each signal power and data rate table based on the updated signal power and code rate table when the updated signal power and code rate table is received, and send a respective updated signal power and data rate table to each wireless access point of the plurality of wireless access points.

In implementations, the at least one CBSD further configured to for each row in the signal power and data rate table: determine a difference between an access point signal power and a CBSD signal power, determine whether the difference is within a defined range, and maintain a code rate value in the signal power and code rate table when the difference is within the defined range. In implementations, the at least one CBSD further configured to for each row in the signal power and data rate table: determine whether the difference is less than a reference signal power from the signal power and code rate table when the difference is outside the defined range, and maintain the code rate value in the signal power and code rate table when the difference is equal to or greater than the reference signal power. In implementations, the at least one CBSD further configured to: for each row in the signal power and data rate table: determine whether a data rate is greater than the code rate when the difference is less than the reference signal power, and maintain the code rate value in the signal power and code rate table when the code rate is equal to or greater than the data rate. In implementations, the at least one CBSD further configured to for each row in the signal power and data rate table increase the code rate value when the code rate is less than the data rate. In implementations, the wireless controller further configured to generate the signal power and data rate table by statistically aggregating each signal power and data rate table sent by the plurality of wireless access points. In implementations, the defined event is at least one of ending of an event, starting of an event, user device density, data traffic, geographic location, and base station and access point density.

In implementations, a method for dynamic data rate update including statistically combining, by a wireless controller, multiple access point data rate tables to generate an access point table when a defined event occurs, sending, by the wireless controller to a base station, the access point data rate table, updating, by the base station, a base station code rate table based on the access point data rate table when defined power comparisons are met, confirming, by the base station, the validity of the updated base station code rate table based on received user device measurements, sending, by the base station to the wireless controller, the updated base station data rate table upon confirmation, updating, by the wireless controller, the access point data rate table with a received base station code rate table, and sending, by the wireless controller, a respective updated access point data rate table to each access point which sent an access point data rate table.

In implementations, the method further includes reverting, by the base station, to a previous base station data rate table if the updated base station code rate table is inoperable. In implementations, the method further includes for each row in the access pint data rate table: determine a difference between an access point signal power and a base station signal power, determine whether the difference is within a defined range, determine whether the difference is less than a reference signal power from the base station code rate table when the difference is outside the defined range, determine whether a data rate is greater than the code rate when the difference is less than the reference signal power, and increase a code rate value when the code rate is less than the data rate.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for dynamic data rate update, the method comprising:
confirming, by a base station a validity of an access point power-data rate table, by receiving measurements from a user device responsive to communications using the access point power-data rate table;
reverting, by the base station, to a previous base station power-data rate table if the measurements indicate that the access point power-data rate table is incorrect;
sending, by the base station to a wireless controller, one of an updated base station power-data rate table based on the access point power-data rate table or the previous base station power-data rate table;
updating, by the wireless controller, the access point power-data rate table with a received base station power-data rate table; and
sending, by the wireless controller, an updated access point power-data rate table to an access point.

2. The method of claim 1, the method further comprising:
determining, for each row, whether a received signal strength indicator from the access point power-data rate table and a received signal strength indicator from a base station power-data rate table are within a defined range; and
foregoing an update, for each row, when the received signal strength indicator from the access point power-data rate table and a received signal strength indicator from the base station power-data rate table are within the defined range.

3. The method of claim 2, wherein the defined range is 1 dB.

4. The method of claim 1, the method further comprising:
determining, for each row, whether a difference between a received signal strength indicator from the access point power-data rate table and a received signal strength indicator from a base station power-data rate table is less than a reference signal received power from the base station power-data rate table when the received signal strength indicator from the access point power-data rate table and a received signal strength indicator from the base station power-data rate table fall outside a defined range; and
foregoing an update, for each row, when the difference is equal to or greater than the reference signal received power.

5. The method of claim 4, the method further comprising:
determining, for each row, whether a data rate from the access station power-data rate table is greater than the data rate in the base station power-data rate table when the difference is less than the reference signal received power; and
foregoing an update, for each row, when the data rate in the base station power-data rate table is equal to or greater than the data rate from the access station power-data rate table.

6. The method of claim 5, the method further comprising:
increasing, for each row, the data rate in the base station power-data rate table when the data rate in the base station power-data rate table is less than the data rate in the access station power-data rate table.

7. The method of claim 1, the method further comprising:
receiving, by the wireless controller, multiple access station power-data rate tables from multiple access points; and
statistically combining, by the wireless controller, the multiple access station power-data rate tables to generate the access point power-data rate table.

8. The method of claim 7, wherein updating, by the wireless controller comprises:
updating, by the wireless controller, each of the multiple access station power-data rate tables using the received base station power-data rate table.

9. The method of claim 1, the method further comprising:
performing, by the wireless controller, dynamic data rate update based on a defined event.

10. The method of claim 9, wherein the defined event is at least one of ending of an event, starting of an event, user device density, data traffic, geographic location, and base station and access point density.

11. A system comprising:
a plurality of wireless access points, each wireless access point having a signal power and data rate table;
at least one Citizens Broadband Radio Service (CBRS) device (CBSD) having a signal power and code rate table; and
a wireless controller configured to send a signal power and data rate table to the at least one CBSD based on a defined event,
wherein the at least one CBSD is configured to send a confirmed updated signal power and code rate table when updating thresholds are met for a received signal power and data rate table; and
wherein the wireless controller is configured to:
update each signal power and data rate table based on a received confirmed updated signal power and code rate table; and
send a respective updated signal power and data rate table to each wireless access point of the plurality of wireless access points.

12. The system of claim 11, the at least one CBSD further configured to:
for each row in the signal power and data rate table:
determine a difference between a wireless access point signal power and a CBSD signal power;
determine whether the difference is within a defined range; and
maintain a code rate value in the signal power and code rate table when the difference is within the defined range.

13. The system of claim 12, the at least one CBSD further configured to:
for each row in the signal power and data rate table:
determine whether the difference is less than a reference signal power from the signal power and code rate table when the difference is outside the defined range; and
maintain the code rate value in the signal power and code rate table when the difference is equal to or greater than the reference signal power.

14. The system of claim 13, the at least one CBSD further configured to:
for each row in the signal power and data rate table:
determine whether a data rate is greater than a code rate when the difference is less than the reference signal power; and
maintain the code rate value in the signal power and code rate table when the code rate is equal to or greater than the data rate.

15. The system of claim 14, the at least one CBSD further configured to:
for each row in the signal power and data rate table:
increase the code rate value when the code rate is less than the data rate.

16. The system of claim 11, the wireless controller further configured to generate the signal power and data rate table by statistically aggregating each signal power and data rate table sent by the wireless controller.

17. The system of claim 11, wherein the defined event is at least one of ending of an event, starting of an event, user device density, data traffic, geographic location, and base station and access point density.

18. A method for dynamic data rate update, the method comprising:
updating, by a base station when defined power comparisons are met, a base station code rate table based on an access point data rate table sent by a wireless controller;
confirming, by the base station, a validity of an updated base station code rate table based on received user device measurements;
updating, by the wireless controller, the access point data rate table with a received confirmed updated base station code rate table; and
sending, by the wireless controller, a respective updated access point data rate table to each access point which sent an access point data rate table.

19. The method of claim 18, the method further comprising:
reverting, by the base station, to a previous base station data rate table if the updated base station code rate table is inoperable.

20. The method of claim 18, the method further comprising:
for each row in the access point data rate table:
determine a difference between an access point signal power and a base station signal power;
determine whether the difference is within a defined range;
determine whether the difference is less than a reference signal power from the base station code rate table when the difference is outside the defined range;
determine whether a data rate is greater than the code rate when the difference is less than the reference signal power; and
increase a code rate value when the code rate is less than the data rate.

* * * * *